(12) United States Patent
Schmidt

(10) Patent No.: US 12,402,002 B2
(45) Date of Patent: Aug. 26, 2025

(54) MOBILE APP LOGIN AND DEVICE REGISTRATION

(71) Applicant: NT-ware Systemprogrammierungs-GmbH, Bad Iburg (DE)

(72) Inventor: Paul Schmidt, Osnabrück (DE)

(73) Assignee: NT-ware Systemprogrammierungs-GmbH, Bad Iburg (DE)

( * ) Notice: Subject to any disclaimer, the term of this patent is extended or adjusted under 35 U.S.C. 154(b) by 214 days.

(21) Appl. No.: 18/018,015

(22) PCT Filed: Jul. 13, 2021

(86) PCT No.: PCT/EP2021/069493
§ 371 (c)(1),
(2) Date: Jan. 25, 2023

(87) PCT Pub. No.: WO2022/023026
PCT Pub. Date: Feb. 3, 2022

(65) Prior Publication Data
US 2023/0284013 A1 Sep. 7, 2023

(30) Foreign Application Priority Data
Jul. 29, 2020 (GB) .................................... 2011763

(51) Int. Cl.
*H04W 12/06* (2021.01)
*G06F 21/35* (2013.01)
*G06F 21/36* (2013.01)

(52) U.S. Cl.
CPC ............ *H04W 12/06* (2013.01); *G06F 21/35* (2013.01); *G06F 21/36* (2013.01)

(58) Field of Classification Search
CPC ..................................................... H04W 12/06
See application file for complete search history.

(56) References Cited

U.S. PATENT DOCUMENTS 9,130,929 B2 * 9/2015 Dorfman ................. G06F 21/35
2010/0275010 A1 10/2010 Ghirardi
(Continued)

FOREIGN PATENT DOCUMENTS

KR 2020 0015136 A 2/2020

OTHER PUBLICATIONS

Barriga, J.J, et al., "Enhancement to the Privacy-Aware Authentication for Wi-Fi Based Indoor Positioning Systems", Aug. 14, 2019.

*Primary Examiner* — Simon P Kanaan
(74) *Attorney, Agent, or Firm* — Canon U.S.A., Inc. IP Division

(57) ABSTRACT

A mobile device for providing user authentication for a user accessing a website on a further device is provided. The mobile device includes a user interface; a display screen; a camera; a communication module; and a processor wherein the mobile device is configured to receive, via the user interface, an authentication request from a user, generate, using the processor, a machine-readable label generation code responsive to the authentication request, display, on the display screen, the generated machine-readable label generation code, capture, via the camera, an image of a machine-readable label, and verify, using the processor, that the machine-readable label in the captured image was generated using the machine-readable label generation code.

9 Claims, 5 Drawing Sheets

(56) References Cited

U.S. PATENT DOCUMENTS

| | | | |
|---|---|---|---|
| 2013/0111208 A1* | 5/2013 | Sabin | G06F 21/36 |
| | | | 713/176 |
| 2015/0094026 A1* | 4/2015 | Martin | H04W 12/068 |
| | | | 455/411 |
| 2016/0036809 A1 | 2/2016 | Bhimanaik | |
| 2016/0212144 A1* | 7/2016 | Pender | H04L 63/18 |
| 2016/0241532 A1* | 8/2016 | Loughlin-McHugh | |
| | | | H04W 12/068 |
| 2018/0041339 A1 | 2/2018 | Lee | |
| 2023/0215529 A1* | 7/2023 | Khatri | A61B 5/6898 |
| | | | 600/476 |

* cited by examiner

MOBILE APP LOGIN AND DEVICE REGISTRATION

CROSS-REFERENCE TO RELATED APPLICATIONS

The application is the National Phase application of PCT Application No. PCT/EP2021/069493, filed on Jul. 13, 2021 and titled "MOBILE APP LOGIN AND DEVICE REGISTRATION". This application claims the benefit under 35 U.S.C. § 119 (a)-(d) of United Kingdom Patent Application No. 2011763.6, filed on Jul. 29, 2020 and titled "MOBILE APP LOGIN AND DEVICE REGISTRATION". The above cited patent application is incorporated herein by reference in its entirety.

TECHNICAL FIELD

The present invention relates to a mobile device and a method of providing, using a mobile device, user authentication for a user accessing a website. The present invention also relates to a system comprising the above features, and a program configured to confer the above functionality.

BACKGROUND

A variety of services may be accessible to a user accessing a website through a mobile device. It is common for websites to provide a level of security to prevent unauthorised users from accessing certain areas of a website, e.g. a secure dashboard. Prior art user authentication methods include the use of a registered username and password.

However, prior art methods of providing user authentication can be inconvenient for a user. For example, it may be difficult for a user to accurately enter long usernames and passwords using a relatively small user interface (e.g. a touch screen of a mobile phone). Further, many websites recommend or require that passwords contain special characters (e.g. &, !, ?, etc.), capitalised letters, or numbers, which are often not displayed on a standard keyboard displayed on a mobile phone touch screen. The repeated switching between keyboards can be inconvenient to a user, and can increase the likelihood that a password is entered incorrectly. This can cause the user to fail the authentication process, and can potentially cause the user to be locked out of a website.

The present invention attempts to address some of the drawbacks associated with prior art user authentication processes.

SUMMARY

Aspects of the present invention are set out by the independent claims.

According to a first aspect, there is provided a mobile device for providing user authentication for a user accessing a website on a further device, the mobile device comprising, a user interface, a display screen, a camera, a communication module, and a processor, wherein the mobile device is configured to receive, via the user interface, an authentication request from a user, generate, using the processor, a machine-readable label generation code responsive to the authentication request, display, on the display screen, the generated machine-readable label generation code, capture, via the camera, an image of a machine-readable label, and verify, using the processor, that the machine-readable label in the captured image was generated using the machine-readable label generation code. According to a second aspect, there is provided a system that includes the mobile device discussed above, a further device configured to access a website, and a physical or virtual server. According to a third aspect, there is provided method of using a mobile device having a user interface, display screen, a camera, a communication module and a processor whereby the method includes receiving, via the user interface, an authentication request from a user, generating, using the processor, a machine-readable label generation code responsive to the authentication request, displaying, on the display screen, the generated machine-readable label generation code, capturing, via the camera, an image of a machine-readable label, and verifying, using the processor, that the machine-readable label in the captured image was generated using the machine-readable label generation code. According to a fourth aspect, there is provided a computer-readable storage medium storing instructions that when executed by a processor of a mobile device having a user interface, a display screen, a camera, a communication module and the processor, configures the mobile device to perform a method comprising receiving, via the user interface, an authentication request from a user, generating, using the processor, a machine-readable label generation code responsive to the authentication request, displaying, on the display screen, the generated machine-readable label generation code, capturing, via the camera, an image of a machine-readable label, and verifying, using the processor, that the machine-readable label in the captured image was generated using the machine-readable label generation code.

BRIEF DESCRIPTION OF THE DRAWINGS

Embodiments will now be described, by way of example only, with reference to the accompanying drawings, in which.

DETAILED DESCRIPTION

Various embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1:
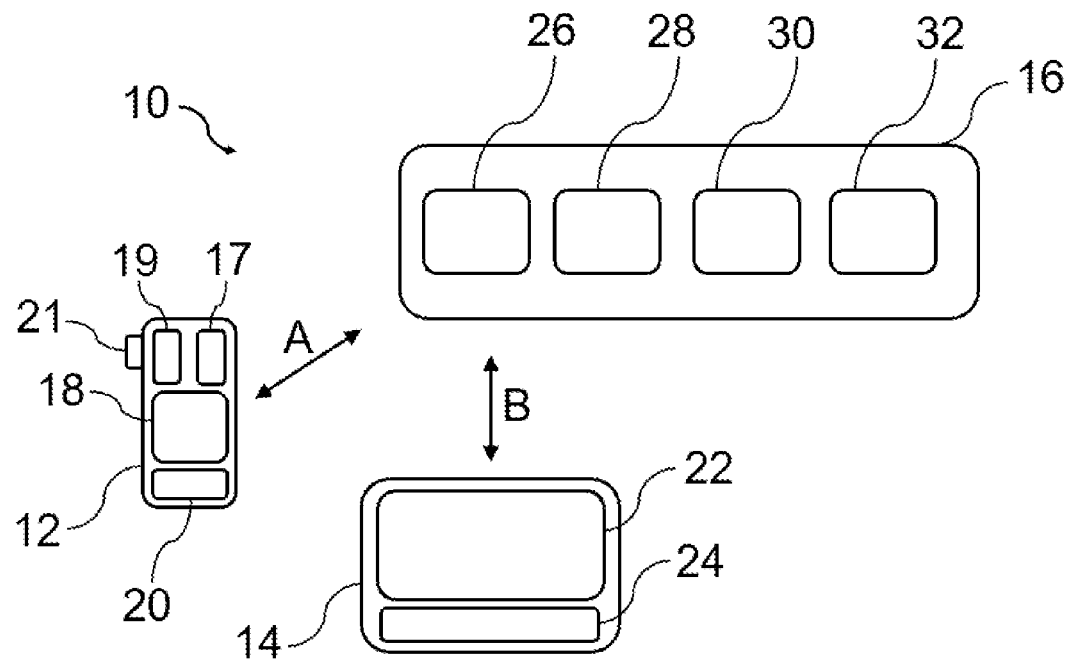
FIG. 1 schematically illustrates an example of a system that includes a mobile device and further device connected to a server.

FIG. 1 illustrates a system 10. The system comprises a mobile device 12, a further device 14 and a server 16. In this application, "server" includes a physical server, an application server, a cloud service provided on hosted or virtualised servers, or a true cloud service. The mobile device 12 is configured for two-way communication between the mobile device 12 and the server 16 as indicated by arrow A. The further device 14 is configured for two-way communication between the further device 14 and the server 16 as indicated by arrow B. In the example shown in FIG. 1, the two-way communication in each case takes place via wireless internet. However, any suitable communication protocol could be used in other examples.

The mobile device 12 comprises a display screen 18 and a user interface 20. In the example shown in FIG. 1, the user interface 20 is separate to the display screen 18. However, in other examples the user interface 20 could be integrated with the display screen 18, e.g. as a touch screen. The mobile device 12 comprises a communication module 17, via which the mobile device performs two-way communication with the server 16, and a processor 19. The mobile device 12 further comprises a camera 21 capable of capturing images that may be processed by the processor 19. In the example shown in FIG. 1, the mobile device 12 is a mobile telephone. Other suitable mobile devices include tablet computers and other types of handheld computers.

The further device 14 comprises a display screen 22 and a user interface 24. In the example shown in FIG. 1, the user interface 24 is separate to the display screen 22. However, in other examples the user interface 24 could be integrated with the display screen 22, e.g. as a touch screen.

In the example shown in FIG. 1, the further device 14 is a laptop computer. However, any suitable device (i.e. any device capable of accessing a website) could be used in practice. Examples include desktop computers, tablets and other mobile devices.

The server 16 comprises a communication module 26, a processor 28 and a machine-readable label generation module. In the example shown in FIG. 1, the machine-readable label generation module is a QR-code generation module 30 capable of generating Quick Response (QR) codes. QR codes are well-known in the art as a type of machine-readable label containing non-volatile machine-readable content. However, in other examples the server 16 may comprise modules capable of generating any suitable machine-readable labels, such as linear barcodes, or images in which machine-readable code may be embedded. Further, in the example shown in FIG. 1, the QR-code generation module 30 is shown as a module separate from the processor 28. However, in some examples, the QR-code generation module 30 could be integrated with the processor 28, e.g. as a processing section of the processor 28. The server 16 further comprises a memory 32 capable of hosting a website which is accessible by the further device 14 through two-way communication B.

Figure 2:
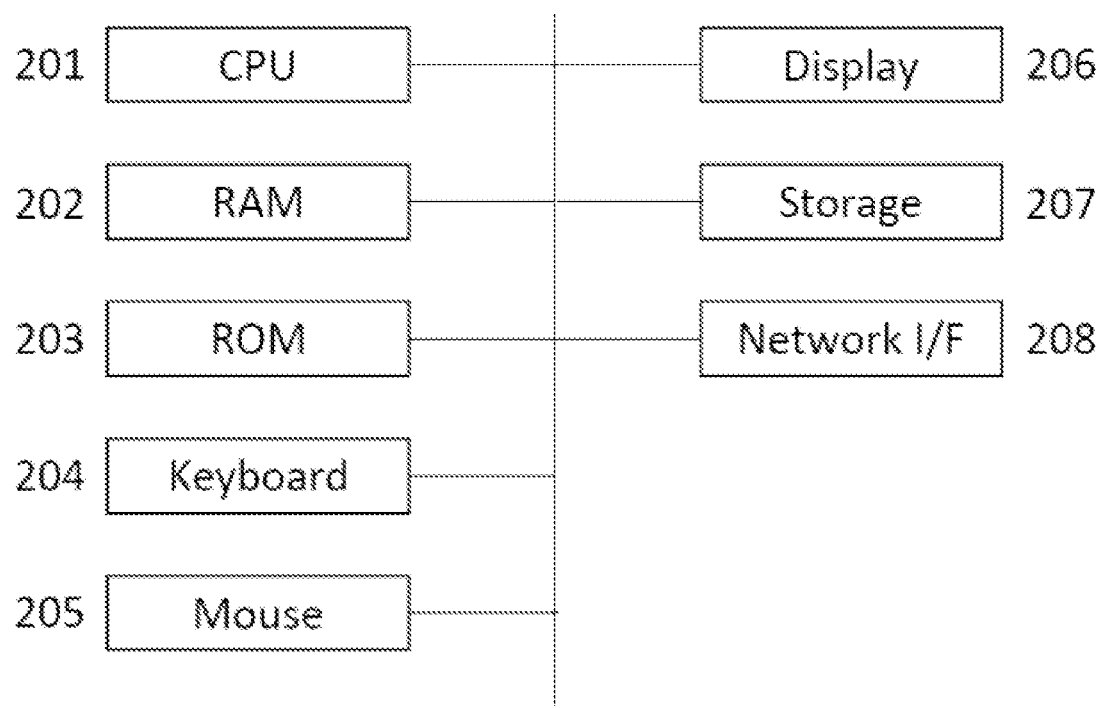
FIG. 2 schematically illustrates a further device suitable for use in the system of FIG. 1.

FIG. 2 illustrates a further device suitable for use as the further device 14 of FIG. 1. FIG. 2 shows selected standard components that are present in client computers such as the further device 14. The further device 14 is an example of an information processing apparatus, and in the embodiment of FIG. 1, it is a general-use laptop computer. The further device 14 has a CPU (Central Processing Unit) 201, a RAM (Random Access Memory) 202, a ROM (Read Only Memory) 203, a keyboard 204, a mouse 205, a display unit 206, an external storage device 207, and a network interface 208 which are all connected to each other via a bus.

The CPU 201 is a standard processor such as those available from Intel® or AMD®. The RAM 202 is a conventional RAM and is used as a temporary storage area for instructions being processed by the CPU 201. The ROM 203 is a memory that stores certain applications such as a BIOS. The keyboard 204 and mouse 205 form input devices for the further device 14 in a conventional manner. The display unit 206 is a TFT display for providing output display for a user. The external storage device 207 is a removable USB hard disk drive. Network interface 208 is a set of standard components that allows the further device 14 to communicate with the server 16. Such devices are well known in the art and may include additional components (video cards etc.) or other components.

Figure 3:
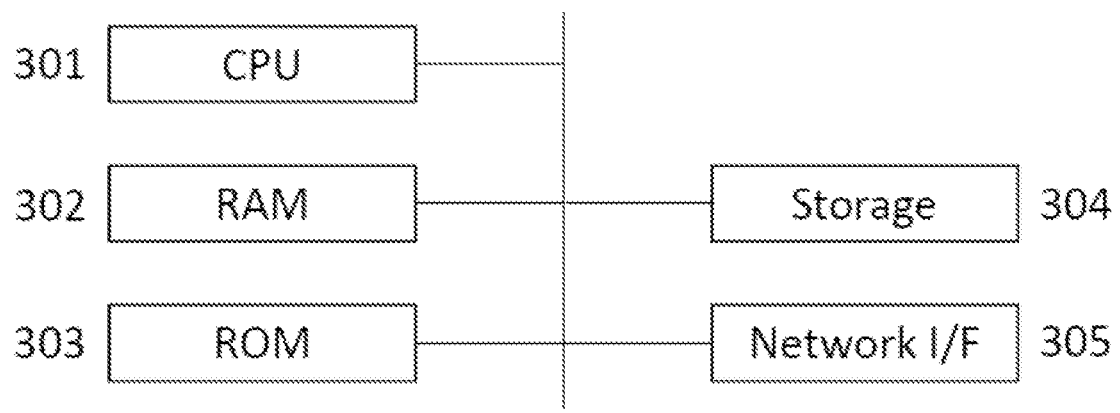
FIG. 3 schematically illustrates a server suitable for use in the system of FIG. 1.

FIG. 3 illustrates a server suitable for use as the server 16 of FIG. 1. FIG. 3 shows selected standard components that are present in servers. The server has a CPU 301, a RAM 302, a ROM 303, a storage 304, and a network interface 305 which are all connected each other via a bus. It is possible for those components of the server to be either distributed to multiple physical locations or integrated in a single housing. While the examples of FIGS. 1 and 3 describe physical servers, some or all of the services provided by such physical (e.g. local) servers may be provided by cloud services. Such services are typically accessed via the Internet. A cloud service can be considered a virtual server, due to the server functionality in fact being provided by any one of a plurality of online servers. Such a plurality of online servers is often referred to as a cloud, due to being located externally and remotely from the network. Thus, the mobile device 12 and the further device 14 may be configured to exchange information with a cloud service. A cloud service can also be considered as a software platform that provides an abstraction layer on top of the server (physical or virtual) layer. This is often referred to as true cloud (rather than hosted or virtualised servers). True cloud software is written to run on a software platform and to request or release resources as required.

In the example of FIG. 3, the CPU 301 is a standard processor such as those available from Intel® or AMD®. The RAM 302 is a conventional RAM and is used as a temporary storage area for instructions being processed by the CPU 301. The ROM 303 is a memory that stores certain applications for use by the server 16, such as the BIOS. The storage 304 is a hard disk drive. Network interface 305 is a set of standard components that allows the server 16 to communicate with the mobile device 12 and further device 14.

Figure 4A:
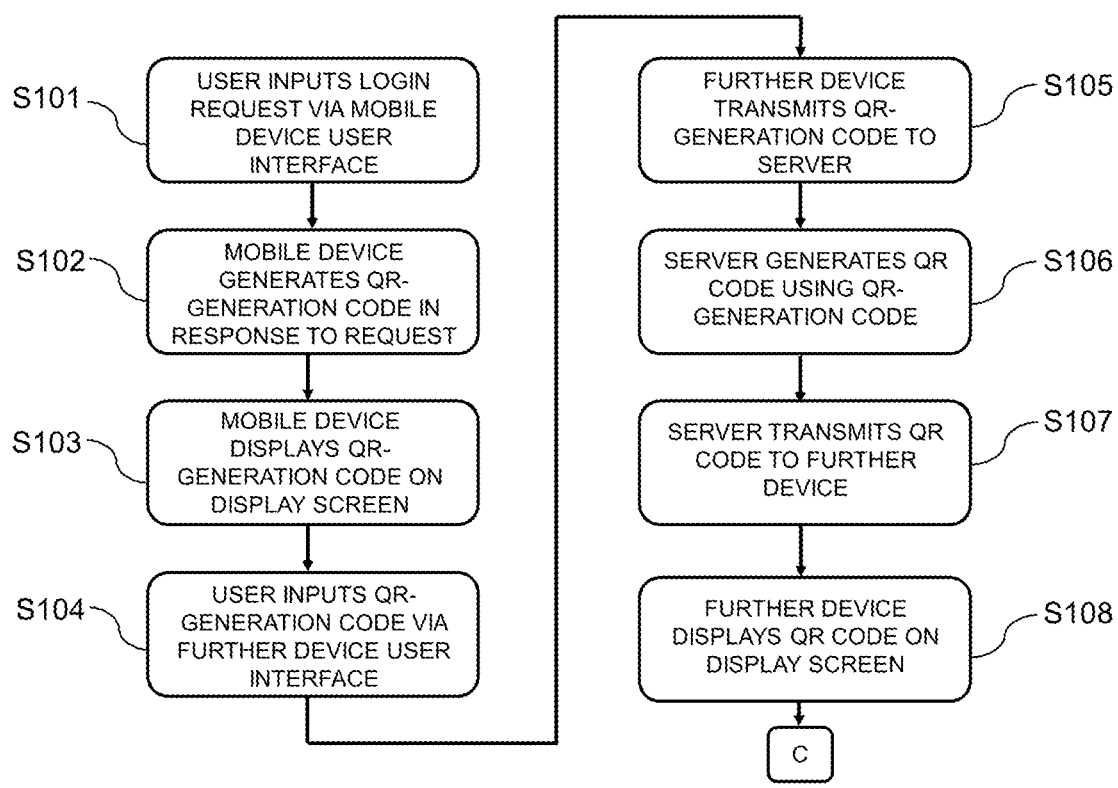
FIG. 4A and FIG. 4B illustrate an example of a flowchart describing steps of an authentication method.
Figure 4B:
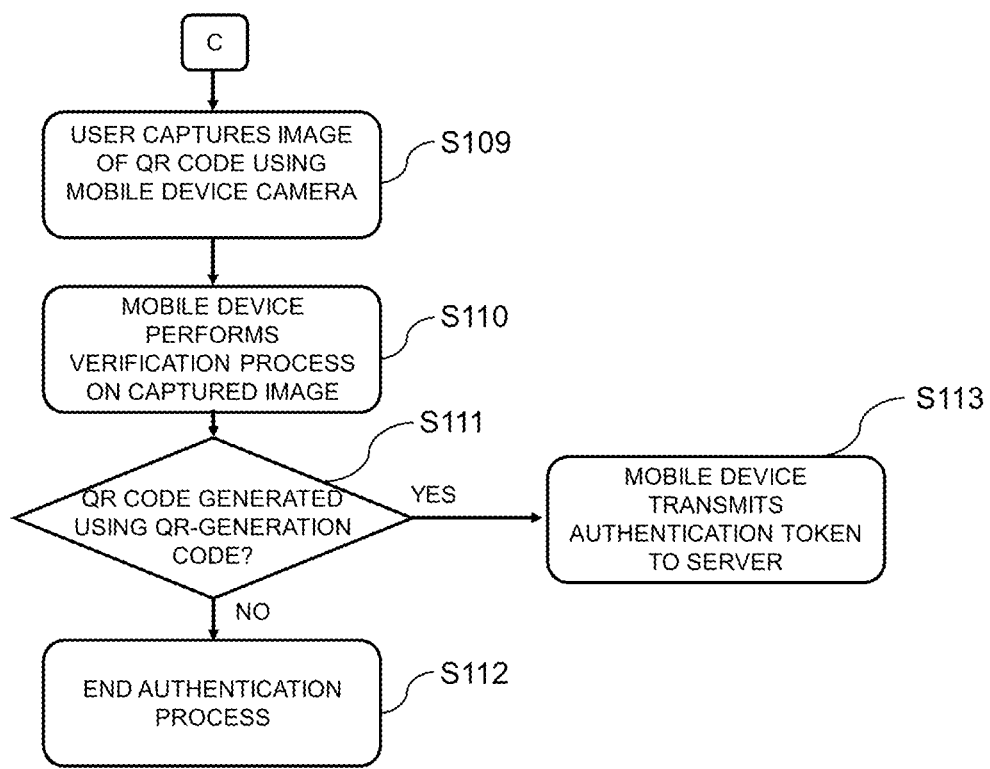

A method of providing user authentication using the system shown in FIG. 1 will now be described with reference to the flowcharts shown in FIGS. 4A and 4B. While the specific example of FIGS. 4A and 4B is described with respect to the use of a QR code to provide user authentication, it should be appreciated that other types of machine-readable label could be substituted (e.g. linear barcodes, images with encoded machine-readable data, etc.).

When a user attempts to access a website hosted by the server 16 (or part of a website, e.g. a secure dashboard) through an app running on the mobile device 12, the server performs a check to determine whether or not the user has logged in to the app. If it is determined that the user has not yet logged in to the app, a user authentication process is initiated. A method of providing user authentication begins with step S101.

In step S101, a user inputs a login request via the user interface 20 of the mobile device 12. The login request may be input to the app running on the mobile device 12 either manually, by the user entering a username and password, or by the user scanning a machine-readable label. These two options are presented to the user through the app.

If the user selects the option of scanning a machine-readable label, the method moves on to step S102, in which the mobile device 12 generates a QR-generation code. This process may be carried out by the processor 19 of the mobile device 12.

Once the QR-generation code has been generated, the method moves on to step S103, in which the generated QR-generation code is displayed on the screen 18 of the mobile device 12. In the present example, the QR-generation code is a six-digit number. However, in other examples, text string, alphanumeric codes, or any other suitable code may be generated. The QR-generation code may be displayed on the display screen 18 for a limited predetermined time period (e.g. one minute), in order to reduce the likelihood of an unauthorised user viewing the QR-generation code. The generated QR-generation code is temporarily stored in a memory of the mobile device 12.

After the QR-generation code has been displayed on the display screen 18, the method moves on to step S104, in which the user, having viewed the QR-generation code on the display screen 18, inputs the QR-generation code to the further device 14 via the user interface 24 of the further device 14. In the example shown in FIG. 1, the user interface 24 of the further device 14 is a keyboard. However, in other examples the user interface 24 could comprise a touch screen, a speech-to-text interface, or any suitable interface through which a user may input a code.

To input the QR-generation code, a user first needs to access a code entry screen on the further device 14. The code entry screen may be a section of the website that the user is attempting to access on the mobile device 12. In order to access the code entry screen, a user needs to first input security credentials. The server 16 checks the input security credentials against a list of authenticated users stored in the memory 32 to confirm that the user is an authenticated user before displaying the code entry screen. The input of security credentials could be the provision of a username and password, the input of a PIN, the placement of the user's finger on a fingerprint scanner of the further device 14, or any other suitable provision of security credentials.

Once the user has input the QR-generation code to the further device 14, the method moves on to step S105, in which the further device 14 transmits the QR-generation code entered by the user to the server 16 through two-way communication B. The server 16 receives the QR-generation code via the communication module 26.

Once the server 16 has received the QR-generation code, the method moves on to step S106, in which the server generates, in the QR-code generation module 30, a QR-code using the QR-generation code. The QR-code generation module 30 encodes authentication information within the QR-code that may be later extracted from the QR-code by the processor of the mobile device 12. The authentication information may indicate the user's identity based on the security credentials input to the further device 14 by the user in order to access the code entry screen. The QR-code generation module also encodes code-identification information within the QR-code that may later be extracted by the processor 19 of the mobile device 12, said code-identification information indicating the specific QR-generation code that was used to generate the QR-code.

Once the server 16 has generated the QR-code the method moves on to step S107, in which the server 16 transmits the QR-code to the further device 14 through two-way communication B.

Once the further device 14 has received the QR-code from the server 16, the method moves on to step S108, in which the further device 14 displays the received QR-code on the display screen 22. The method then moves on to step C, where the method continues in FIG. 4B.

From step C, the method moves on to step S109, in which a user captures an image of the QR-code being displayed on the display screen 22 of the further device 14 using the camera 21 of the mobile device 12. The user may capture an image using an image capture screen displayed in the app running on the mobile device 12. The app may display, on the display screen 18 of the mobile device 12, a guide outline corresponding to the size and shape of a QR-code, such that when the app detects that the user has appropriately positioned the camera to fill the guide outline with the QR-code displayed on the display screen 22 of the further device 14, the app performs an auto-focus process to ensure that the captured image of the QR-code is properly in focus. The app may be further configured to automatically capture an image when the app detects that the user has appropriately positioned the camera to fill the guide outline with the QR-code displayed on the display screen 22 of the further device 14.

Once an image of the QR-code has been captured by the user, the method moves on to step S110, in which the mobile device 12 performs a verification process on the captured image. The mobile device 12 performs the verification process by extracting code-identification information from the captured image of the QR-code, and comparing the extracted code-identification information to the QR-generation code stored in the memory of the mobile device 12.

The potential outcomes of the verification step are illustrated by step S111. A first outcome, illustrated by NO, occurs when the mobile device 12 determines that the QR-code in the captured image was not generated using the QR-generation code stored in the memory of the mobile device 12. In this situation, the method moves on to step S112, in which the authentication process is immediately ended, e.g. by closing and/or locking the app running on the mobile device 12. In some examples, the method may instead return to step S109, with the app prompting the user to re-try capturing the image of the QR-code displayed on the display screen 22 of the further device 14. This process may be repeated a predetermined number of times (e.g. three attempts) before the method moves on to step S112.

A second outcome, illustrated by YES, occurs when the mobile device determines that the QR-code in the captured image was generated using the QR-generation code stored in the memory of the mobile device 12. In this situation, the method moves on to step S113, in which the mobile device 12 generates an authentication token. The authentication token contains authentication information extracted from the QR code.

The mobile device 12 then transmits the authentication token to the server 16. The server 16 compares the authentication information of the transmitted authentication token to the authentication information stored in the memory 32, and confirms that they match one another.

The authentication token may serve several purposes. Firstly, the authentication token may be used by the server 16 to authenticate the user, such that the user is permitted to access a secure section of the website hosted by the server 16 through the mobile device 12. Additionally or alternatively, the authentication token may be used by the server 16 to register the mobile device 12 as an authenticated device, such that a secure section of the website hosted by the server 16 may be accessed through the app running on the mobile device 12 (e.g. regardless of the user of the mobile device).

In some examples, the authentication may be time limited, such that the server 16 automatically revokes access to the secure section of the website through the mobile device 12 after the expiry of a predetermined time period.

In some examples, multiple mobile devices could be registered as authenticated devices in a device registry stored in the memory 32 of the server 16. For user convenience, devices stored in the device registry may be considered to be pre-authenticated by the server 16, and so may be permitted to access the secure section of the website through an app running on the respective device without repeatedly undergoing the authentication process. However, devices may be added and/or removed from the device registry by a user by undergoing the authentication process.

In some examples, the authentication process itself may be subject to time restrictions. For example, when the server 16 generates a QR code using the QR-generation code, a predetermined period may be initiated (e.g. fifteen minutes) during which authentication tokens based on the generated QR code will be accepted by the server 16. The server 16 may reject authentication tokens based on the generated QR code after the expiry of the predetermined time period, such that the user will need to re-start the authentication process.

The above examples can also be realised by a computer of a system or apparatus (or devices such as a CPU or MPU) that reads out and executes a program recorded on a memory device to perform the functions of the above-described examples, and by a method, the steps of which are performed by a computer of a system or apparatus by, for example, reading out and executing a program recorded on a memory device to perform the functions of the above-described examples. For this purpose, the program is provided to the computer for example via a network or from a recording medium of various types serving as the memory device (e.g., a computer-readable medium such as a non-transitory computer-readable medium).

While the present invention has been described with reference to embodiments, it is to be understood that the invention is not limited to the disclosed embodiments. The present invention can be implemented in various forms without departing from the principal features of the present invention. The scope of the following claims is to be accorded the broadest interpretation so as to encompass all such modifications and equivalent structures and functions.

The invention claimed is:

1. A system comprising:
   a mobile device for providing user authentication for a user accessing a website on a further device, the further device configured to access a website, and a physical or virtual server, the mobile device comprising:
   a user interface;
   a display screen;
   a camera;
   a communication module; and
   a processor;
   wherein the mobile device is configured to:
     receive, via the user interface, an authentication request from a user;
     generate, using the processor, a machine-readable label generation code responsive to the authentication request; and
     display, on the display screen, the machine-readable label generation code;
   wherein the further device is configured to:
     receive an input corresponding to the machine-readable label generation code, and
     transmit the machine-readable label generation code to the server;
   wherein the server comprises:
     a machine-readable label generation module;
   wherein the server is configured to:
     receive the machine-readable label generation code from the further device;
     generate, using the machine-readable label generation module, a machine-readable label, wherein the machine-readable label is encoded with information indicating the machine-readable label generation code; and
     transmit the machine-readable label to the further device;
   wherein the further device comprises a display screen, and wherein the further device is further configured to:
     receive the machine-readable label transmitted from the server, and
     display the machine-readable label on the display screen; and
   wherein the mobile device is further configured to:
     capture, via the camera, an image of the machine-readable label displayed on the display screen; and
     verify, using the processor, that the machine-readable label in the captured image was generated using the machine-readable label generation code.

2. A system according to claim 1, wherein the mobile device is further configured, upon verification that the machine-readable label in the captured image was generated using the machine-readable label generation code, to generate an authentication token using information extracted from the machine-readable label.

3. A system according to claim 2, wherein the mobile device is configured to transmit, via the communication module, the authentication token to the server.

4. The system according to claim 1, wherein the machine-readable label comprises a QR code.

5. A method of providing, using a mobile device that includes a user interface, a display screen, a camera, a communication module and a processor, user authentication for a user accessing a website on a further device, the method comprising the steps of:
   receiving, via the user interface, an authentication request from a user;
   generating, using the processor, a machine-readable label generation code responsive to the authentication request;
   displaying, on the display screen, the machine-readable label generation code;
   receiving, at the further device, an input corresponding to the machine-readable label generation code, and transmitting the machine-readable label generation code to a physical or virtual server;
   receiving, at a machine-readable label generation module of the server, the machine-readable label generation code from the further device;
   generating, using the machine-readable label generation module, a machine-readable label, wherein the machine-readable label is encoded with information indicating the machine-readable label generation code;
   transmitting the machine-readable label to the further device;
   receiving the machine-readable label transmitted from the server;
   displaying the machine-readable label on a display screen of the further device;
   capturing, via the camera, an image of the machine-readable label; and
   verifying, using the processor, that the machine-readable label in the captured image was generated using the machine-readable label generation code.

6. The method according to claim 5, further comprising: upon verification that the machine-readable label in the captured image was generated using the machine-readable label generation code, generating, using the processor, an authentication token using information extracted from the machine-readable label.

7. The method according to claim 6, further comprising:
transmitting, via the communication module, the authentication token to the server.

8. The method according to claim 5, wherein the machine-readable label comprises a QR code.

9. A non-transitory computer-readable storage medium storing instructions that, when executed by a processor of a mobile device, configure the mobile device, which includes a user interface, a display screen, a camera, a communication module and the processor, to execute a method to provide user authentication for a user accessing a website on a further device, the method comprising:
receiving, via the user interface, an authentication request from a user;
generating, using the processor, a machine-readable label generation code responsive to the authentication request;
displaying, on the display screen, the machine-readable label generation code;
receiving, at the further device, an input corresponding to the machine-readable label generation code, and transmitting the machine-readable label generation code to a physical or virtual server;
receiving, at a machine-readable label generation module of the server, the machine-readable label generation code from the further device;
generating, using the machine-readable label generation module, a machine-readable label, wherein the machine-readable label is encoded with information indicating the machine-readable label generation code;
transmitting the machine-readable label to the further device;
receiving the machine-readable label transmitted from the server;
displaying the machine-readable label on a display screen of the further device;
capturing, via the camera, an image of the machine-readable label; and
verifying, using the processor, that the machine-readable label in the captured image was generated using the machine-readable label generation code.

* * * * *